(12) United States Patent
Rumsby

(10) Patent No.: US 9,067,277 B2
(45) Date of Patent: Jun. 30, 2015

(54) LASER PROCESSING A WORKPIECE

(75) Inventor: Phillip Thomas Rumsby, Bladon (GB)

(73) Assignee: M-Solv Ltd., Kidlington, Oxford (GB)

( * ) Notice: Subject to any disclaimer, the term of this patent is extended or adjusted under 35 U.S.C. 154(b) by 652 days.

(21) Appl. No.: 12/918,673

(22) PCT Filed: Feb. 10, 2009

(86) PCT No.: PCT/GB2009/000370
§ 371 (c)(1),
(2), (4) Date: Sep. 17, 2010

(87) PCT Pub. No.: WO2009/103946
PCT Pub. Date: Aug. 27, 2009

(65) Prior Publication Data
US 2011/0000898 A1  Jan. 6, 2011

(30) Foreign Application Priority Data

Feb. 23, 2008 (GB) .................................. 0803305.2

(51) Int. Cl.
| | |
|---|---|
| *B23K 26/00* | (2014.01) |
| *B23K 26/06* | (2014.01) |
| *B23K 26/03* | (2006.01) |
| *B23K 26/04* | (2014.01) |
| *B23K 26/08* | (2014.01) |
| *B23K 26/36* | (2014.01) |
| *B23K 26/40* | (2014.01) |

(52) U.S. Cl.
CPC .............. *B23K 26/06* (2013.01); *B23K 26/032* (2013.01); *B23K 26/048* (2013.01); *B23K 26/0621* (2013.01); *B23K 26/0639* (2013.01); *B23K 26/0648* (2013.01); *B23K 26/0665* (2013.01); *B23K 26/0807* (2013.01); *B23K 26/367* (2013.01); *B23K 26/409* (2013.01); *B23K 2201/34* (2013.01)

(58) Field of Classification Search
CPC ............. B23K 2201/34; B23K 26/032; B23K 26/048; B23K 26/06; B23K 26/0621; B23K 26/0639; B23K 26/0648; B23K 26/0665; B23K 26/0807; B23K 26/367; B23K 26/409
See application file for complete search history.

(56) References Cited

U.S. PATENT DOCUMENTS 3,742,182 A * 6/1973 Saunders .................. 219/121.71
4,338,508 A * 7/1982 Jones et al. ............... 219/121.19
(Continued)

FOREIGN PATENT DOCUMENTS

| EP | 1 569 037 | 8/2005 |
| WO | WO 92/22336 | 12/1992 |

(Continued)

OTHER PUBLICATIONS

Dictionary defintion of epoxy from The American Heritage Dictionary. Copyright @ 2000.*
(Continued)

*Primary Examiner* — Sang Y Paik
(74) *Attorney, Agent, or Firm* — KED & Associates LLP

(57) ABSTRACT

A method is described for simultaneously writing patterns in thin films of material coated on the opposite sides of thin glass or plastic substrates by direct write, laser ablation. The substrates are fully or partially transparent to the laser radiation used and in addition the surfaces of the substrates are not assumed to be flat. Different registered patterns may be applied at the same time to opposite sides of the substrates.

20 Claims, 4 Drawing Sheets

(56) References Cited

U.S. PATENT DOCUMENTS

| | | | |
|---|---|---|---|
| 4,947,022 A * | 8/1990 | Ostroff et al. | 219/121.68 |
| 4,970,369 A * | 11/1990 | Yamazaki et al. | 219/121.85 |
| 5,126,532 A * | 6/1992 | Inagawa et al. | 219/121.7 |
| 5,612,251 A * | 3/1997 | Lee | 438/795 |
| 7,063,467 B2 * | 6/2006 | Nagasaka et al. | 385/88 |
| 7,157,842 B2 * | 1/2007 | Yao | 313/292 |
| 7,732,732 B2 * | 6/2010 | Hiramatsu | 219/121.7 |
| 2003/0027084 A1 | 2/2003 | Mittelstadt | |

FOREIGN PATENT DOCUMENTS

| | | |
|---|---|---|
| WO | WO 98/27450 | 6/1998 |
| WO | WO 99/65639 | 12/1999 |

OTHER PUBLICATIONS

International Search Report issued in PCT/GB2009/000370 dated May 26, 2009.

* cited by examiner

LASER PROCESSING A WORKPIECE

The present invention relates to processing a workpiece comprising a substrate having first and second films formed on its first and second surfaces by direct-write laser ablation in which the substrate is transparent to the laser radiation.

Lasers have been used for many years for the direct processing of workpieces comprising thin films deposited on the surface of thin glass or plastic substrates such as flat panel displays, solar panels or medical sensors. In most cases the requirement is to process a coating on only one side of the substrate and so laser radiation that passes through the substrate does not need to be considered.

U.S. Pat. No. 4,650,525 discloses a solar panel cell interconnection application in which a visible wavelength pulsed laser is directed through the glass substrate in order to remove by laser ablation the thin coatings on the rear side. The laser beam causes no damage to the beam entry side of the substrate as there is no active coating and the laser ablation threshold energy density for bare glass exceeds by a very large margin that for the thin film coating on the rear side.

In some cases there is a requirement to simultaneously laser process thin film materials on opposite sides of thin substrates with different patterns in order to speed production rate and simplify registration between the opposing patterns. U.S. Pat. No. 6,759,625 discloses an apparatus that uses 2 opposing laser beam scanner units to simultaneously direct write different laser structures on opposite sides of PCBs mounted on stages between the 2 scanner units. The substrate is strongly absorbing to the laser radiation so that no radiation passing through the thin coating on one side of the substrate penetrates to the coating on the opposite side.

The present invention is generally concerned with the situation, which has not been hitherto addressed in the art, in which there are films applied to opposite sides of a substrate and these films need to be processed by laser ablation with different patterns and the substrate is transparent to the laser radiation used for processing the films.

Lack of substrate opacity is the situation that occurs, for example, when using laser ablation to apply patterns to the transparent conductive films, such as indium tin oxide, on the opposite sides of thin glass sheets for display or touch-screen manufacturing. In, this case the substrates are usually made of thin glass or polymer. In the case of glass substrates the thickness is usually substantially less than 1 mm and in the case of polymer substrates the thickness can be less than 0.1 mm. In both cases there is a requirement to direct write different patterns onto opposite sides using laser beams that are only very weakly absorbed by the substrate. The thin films on the substrate can be of such materials that they fully absorb, partially absorb or partially reflect low power radiation at the incident laser wavelength. The thin films generally also vary significantly in their degree of adhesion to the substrate surface. These variations in film properties mean that there usually exists a specific set of laser process parameters in terms of wavelength, pulse length and energy density in order to achieve optimum ablation for each particular film and substrate. Once the critical energy density for ablation is exceeded the whole of the film may be removed from the substrate surface or alternatively several laser pulses may be needed to remove it all. Hence, depending on the film transmittance and the ablation properties after some number of laser pulses the laser beam will be partially or fully transmitted into the substrate and will pass on to the opposite side there to interact with the film on that side.

The present invention is also concerned with the issue of how to simultaneously make different laser process patterns in the coatings on opposite sides of thin transparent substrates that are not flat.

To combat the problem of the transmitted laser beam interacting with the film on the rear/far side of the substrate, according to a first aspect, the present invention may provide a method of processing a workpiece, comprising a substrate having first and second films formed on its first and second surfaces, by direct-write laser ablation, in which the substrate is transparent to the laser radiation, the method comprising providing a first laser beam delivery apparatus comprising a laser beam scanner and a lens unit;
positioning the lens unit of the first laser beam delivery apparatus to the first surface side of the substrate to direct-write the first film; and
direct-writing the first film with the laser beam from the lens unit being focussed at a spot short of the first film, whereby the laser beam is diverging as it impinges on the first film.

As the laser beam passes through the substrate it continues to diverge and hence the spot size of the laser beam as it impinges on the second film is larger. Since the area of the laser spot on the second film is larger than that on the first film and since the energy in the pulse at that point is no larger than that on the first film then the energy density in the spot on the second film is lower than that on the first film. This means that if the first and second films have similar laser pulse ablation threshold energy densities, then the energy in the pulse may be set such that as it impinges on the first film the energy density which the first film is subjected to exceeds its ablation threshold energy density and the film is removed, while as it progresses to the second film, the energy density which the second film is subjected to falls below the threshold for ablation of the second film and so it is undamaged.

The size of the laser spot at the focus of a lens depends on the transverse mode structure of the laser beam and diffraction effects within the beam. Diffraction effects depend on the beam diameter and the wavelength. For the case where the laser beam has a single transverse mode the minimum focal spot diameter is given by:—

$$D = 4 \times \lambda \times f\text{-number}/\pi$$

where $\lambda$ is the laser wavelength and the f-number is the ratio of the lens focal length to the beam diameter at the lens. For beams that have more than one transverse mode the minimum focal spot diameter is increased by a so called $M^2$ factor that describes the number of transverse modes.

The minimum focal spot diameter given above is maintained roughly constant along the beam path over some distance called the depth of focus. For the case where the laser beam has a single transverse mode the depth of focus is given by:—

$$D \text{ of } F = 8 \times \lambda (f\text{-number})^2 / \pi$$

For beams that have more than one transverse mode the depth of focus is reduced by the $M^2$ factor. A distance equal to half the depth of focus is often called the Rayleigh range.

To obtain the widest possible laser process window in terms of successfully ablating the first film (on the front side of the substrate) and at the same time minimizing risk of damaging the second film (on the rear side), it is desirable to make the ratio of the laser spot size on the rear side to that on the front side as large as possible. Since the laser beam only markedly starts to diverge after the depth of focus at a distance from the focal point equal to the Rayleigh range the ratio of the rear side spot diameter to that on the front is maximized if the focal point of the laser beam is positioned at close to one Rayleigh range from the substrate surface.

Placing the focal spot higher or lower than one Rayleigh range above the surface leads to a reduction in the ratio of the rear to front spot sizes. If the focal spot is placed more than one Rayleigh range above the front surface then the spot size at the surface will exceed the minimum possible. If the focal spot is placed exactly on the substrate surface then the distance over which the beam diverges within the substrate is reduced by some distance related to the Rayleigh range and the refractive index of the substrate material. In this case the spot size on the front side of the substrate is the minimum possible but that on the rear is less than that achievable when the focal spot is raised above the front surface.

In practice, refractive effects at the air to substrate interface modify the actual laser beam paths and make the real situation somewhat more complex than the simple model described above but never the less placing the laser focus at a distance above the front surface that is close to one Rayleigh range will give the largest difference in front to rear spot sizes, the greatest difference in front to rear energy densities and the widest possible laser process window.

For consistent laser ablation results on a substrate with a coating on one side only it is generally necessary to maintain the separation between the lens and the substrate surface to within a distance equal to the depth of focus. For the case where there are coatings on both sides of the substrate the requirements are rather more stringent since the distance between the lens and the front substrate surface needs to be maintained within a distance that is less than the Rayleigh range and hence is a small fraction of the depth of focus.

Preferably, the above-described method may be practised on the first and second films simultaneously. To this end, the method may further comprise providing a second laser beam delivery apparatus comprising a laser beam scanner and a lens unit, positioning the lens unit of the second laser beam delivery apparatus to the second surface side of the substrate to direct-write the second film, and direct-writing the second film with the laser beam from the lens unit being focussed at a spot short of the second film, whereby the laser beam is diverging as it impinges on the second film.

In order to allow for simultaneous processing of the first and second films, the workpiece must be mounted in such a way so as to allow clear access by the laser beams emanating from the laser beam delivery apparatuses on both sides of the workpiece. This precludes the use of a conventional flat chuck and necessitates the use of a carrier which does not prevent the workpiece from sagging or bending. Preferably, the method further comprises, during direct-writing, adjusting the focus of a said lens unit to compensate for the non-flatness of the workpiece and maintain the focus point at the required distance from the corresponding substrate surface.

According to a second aspect, the present invention may provide a system as defined in Claims 8 to 14 for performing the method as defined in the first aspect of the invention.

Preferred embodiments of the invention use a pair of opposed laser focussing units. The units may consist of 2D optical beam scanner and focus lens units arranged such that one scanner and lens unit is situated on one side of the substrate and the other scanner and lens unit is placed on the opposite side of the substrate. The substrate is close to midway between the two scanner and lens units and the substrate surface is arranged to be close to normal to a line joining the centre of the lenses on the opposing scanner units. One pulsed laser system may be used to generate a beam that passes to the scanner and lens unit on one side of the substrate while a second pulsed laser of similar or different type is used to generate a beam that passes to the scanner and lens unit on the opposite side of the substrate. The focussing lenses are usually of the so called f-theta type. They are attached to each scanner unit in order to focus the beam in the vicinity of the adjacent substrate surface. The laser wavelengths, repetition rates, powers and pulse lengths are, preferably, arranged such that there is sufficient energy in each laser pulse so that in the region of the beam where it is focussed the energy density achievable can readily exceed the energy density needed to ablate and remove all or part of the thin film on the substrate surface. Since the laser ablation threshold energy density for the substrate material usually exceeds that for any thin film coating damage to the underlying substrate does not generally occur.

Since the useable field of a said scanner and lens units is often less than the full area of the substrate, more than one of said scanner and lens units may be used in parallel on a given film.

Preferred embodiments of the invention may comprise a control system that is able to drive all pairs of scanner units simultaneously so that both sides of the substrate are processed at the same time with different patterns.

In the context of the present invention the term 'transparent' covers substrates which not only do not absorb the laser beam but also those which only weakly absorb it.

Exemplary embodiments of the invention will now be described with reference to the accompanying drawings, in which.

Figure 3:
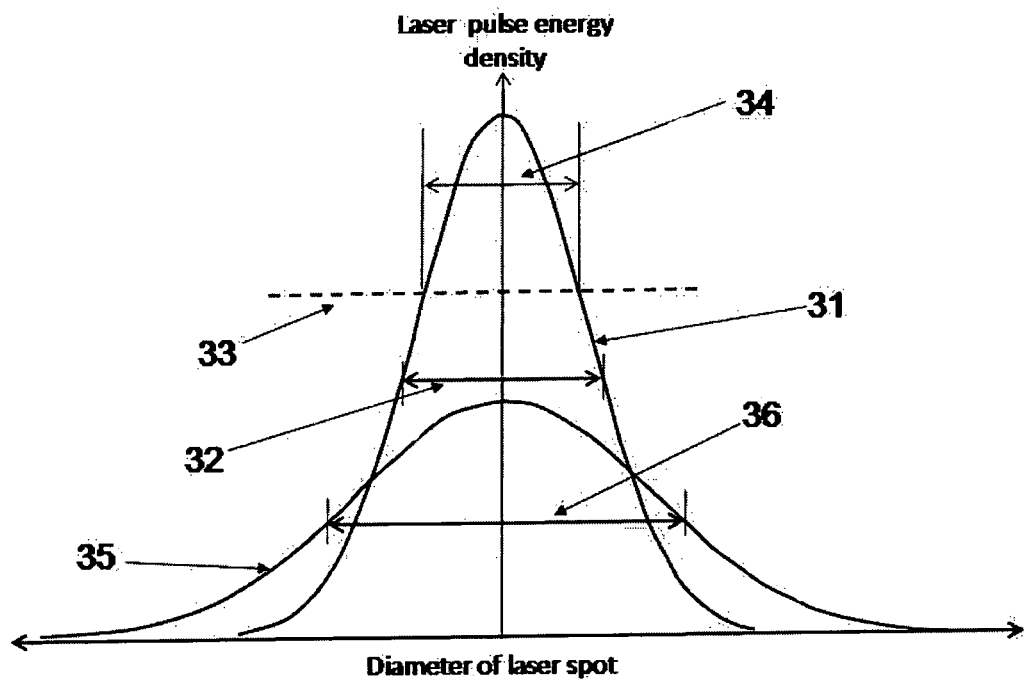
Figure 4:
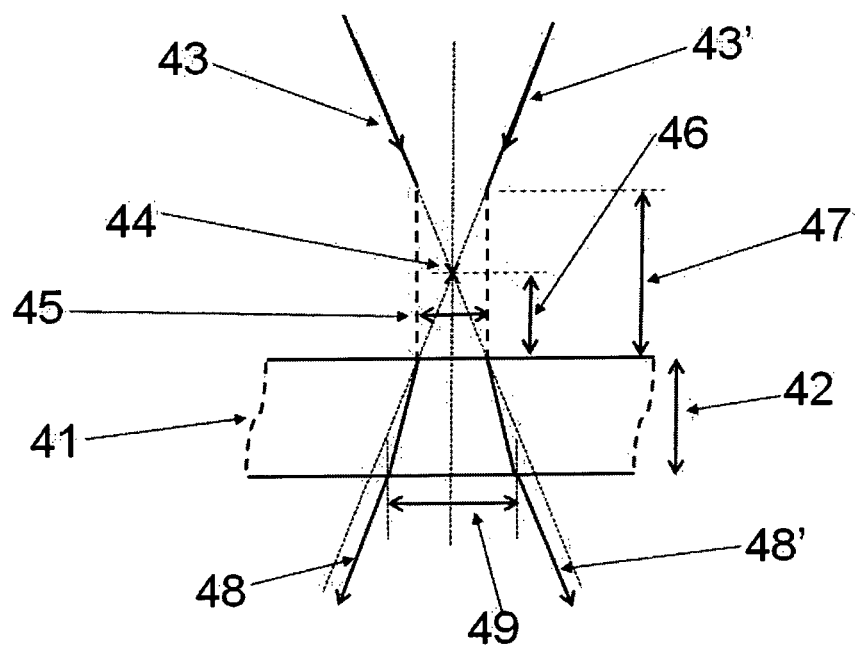
Figure 5:
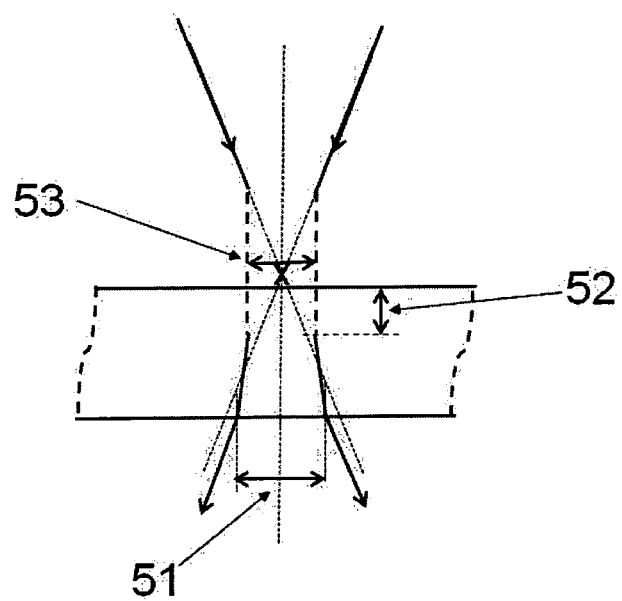
Figure 6:
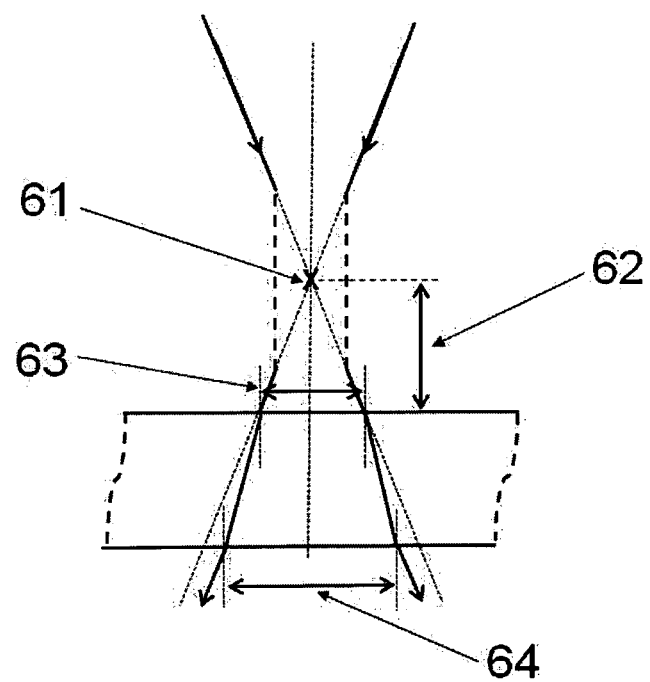
Figure 7:
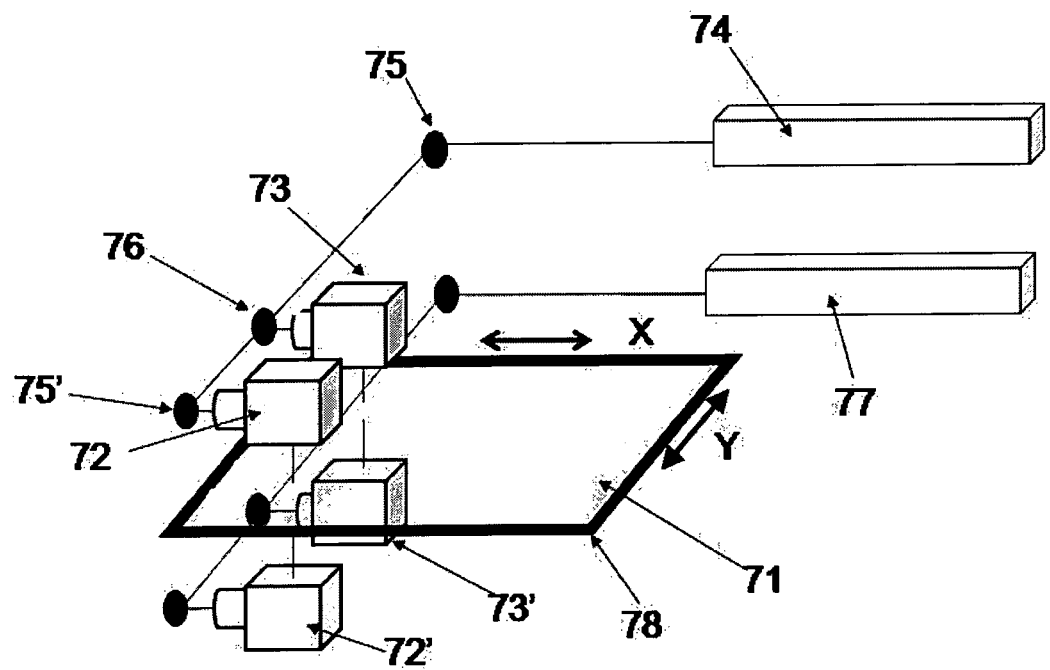
Figure 8:
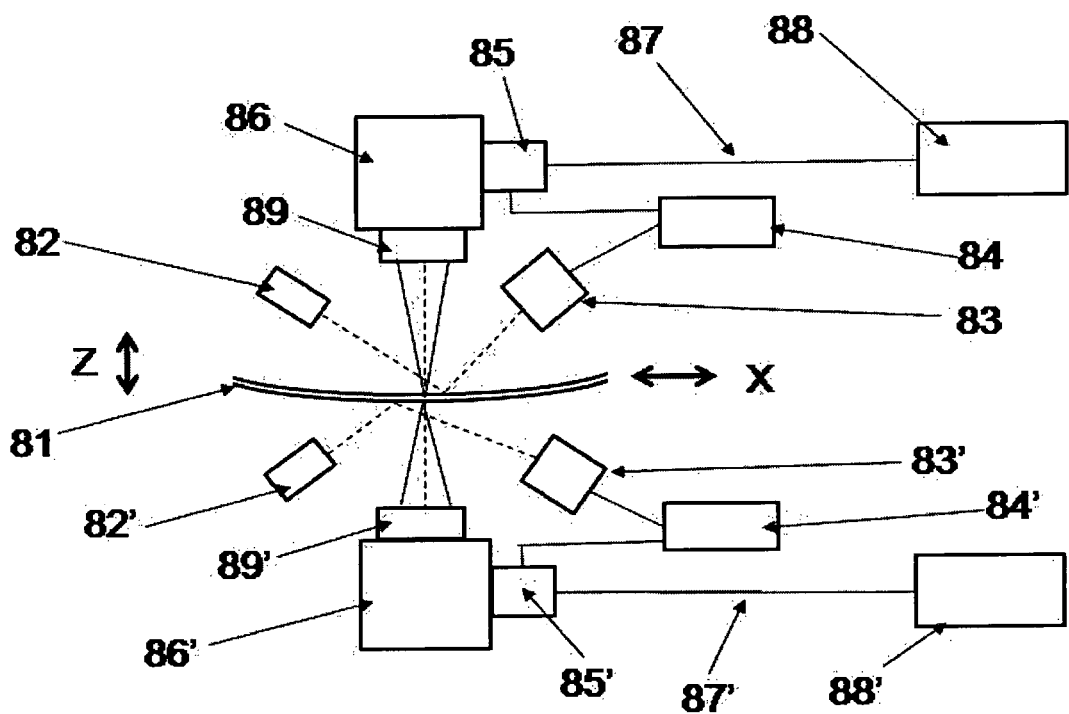

FIG. 3 demonstrates how the laser ablated spot size depends on beam diameter and energy density;

FIG. 4 shows a detailed view of a single laser beam as it passes through a transparent substrate;

FIG. 5 shows a situation similar to FIG. 4 where the focal spot is moved closer to the substrate surface;

FIG. 6 shows a situation similar to FIG. 4 where the focal spot is moved further from the substrate surface;

FIG. 7 shows a practical arrangement for processing both sides of a transparent substrate; and FIG. 8 shows a method to ensure that opposing beams remain focussed at the correct positions with respect to the panel surfaces even when the panel is not flat.

Figure 1:
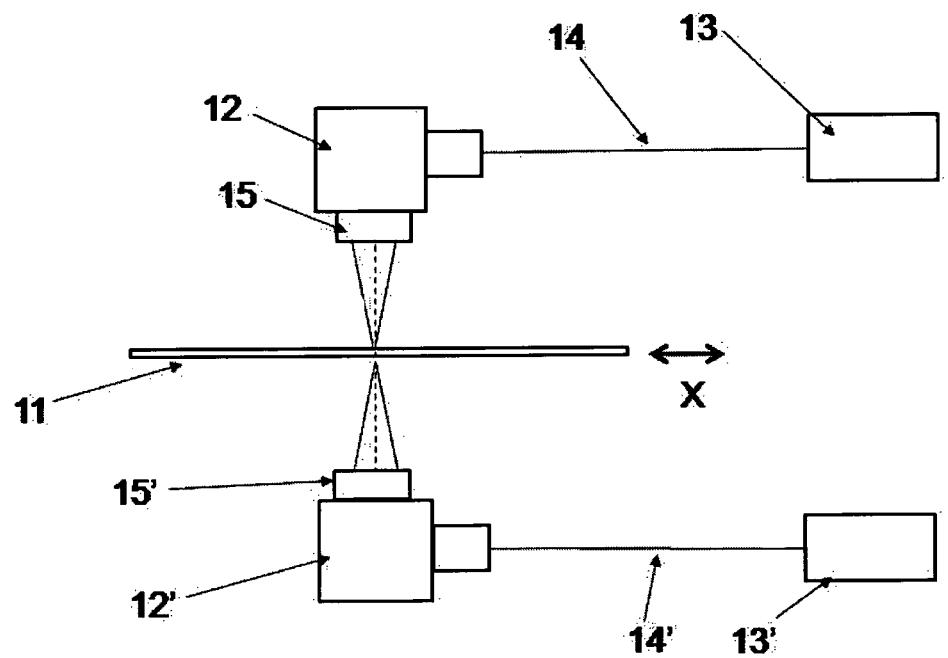
FIG. 1 shows a general arrangement of the laser and optical systems used to process both sides of a transparent panel.

FIG. 1 shows the basic arrangement of the apparatus required to carry out the double sided laser patterning method disclosed. A transparent glass or plastic substrate 11 with thin film coatings on both sides is mounted between two opposing scanner units 12, 12'. A pulsed laser unit 13 emits a beam 14 that passes via the upper scanner unit and an f-theta type lens 15 to be focussed close to the upper surface. A similar arrangement is used with another laser 13' and with a second f-theta lens 15' to focus a beam 14' close to the lower surface of the substrate. A line joining the centres of each f-theta lens is close to normal to the substrate. The substrate is mounted on a frame on stages so it can move in 2 orthogonal axes, X, Y, to allow the full area of both sides of the substrate to be accessed.

Figure 2:
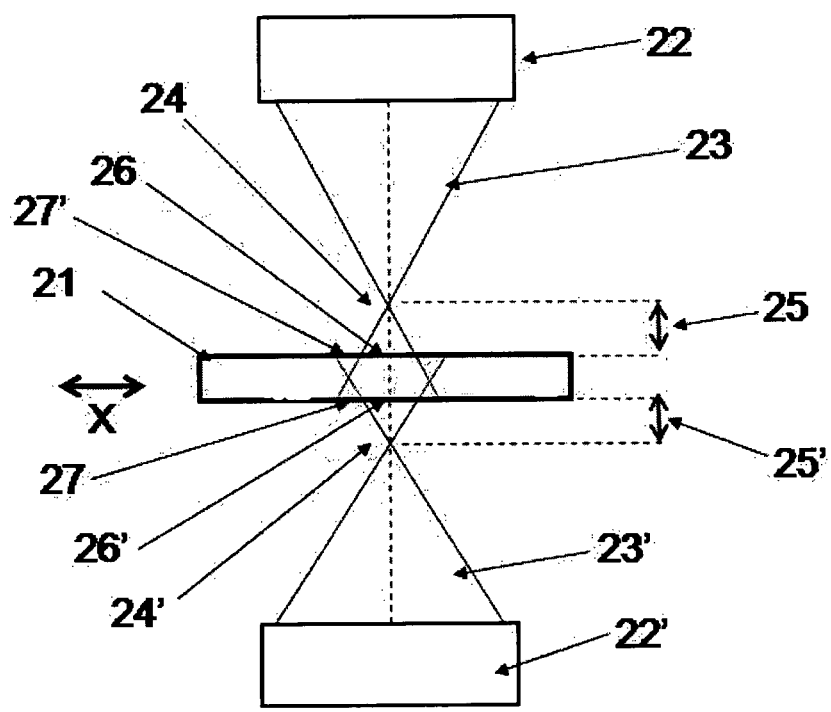
FIG. 2 shows how the opposing laser beams are focussed with respect to the panel surfaces.

FIG. 2 shows in general terms how the focal spots generated by the laser beams on opposite sides of the substrate are positioned with respect to the substrate surfaces. A transparent substrate 21 with coatings on both sides is positioned between 2 opposing scanner and lens units 22, 22'. Laser beams 23, 23' from each scanner and lens units converge to focal points 24, 24' situated at some small distance 25, 25' before the substrate surface. The size of the laser spots 26, 26' created on the substrate surface depend on the properties of the laser beam and the distance of the focal point from the surface. As the focal points are close to but before the surface the beams are starting to diverge as they enter the transparent substrate. The beams continue to diverge as they pass through the transparent substrate to exit on the opposite side with spots 27, 27' that are larger than on the input side. Because of the larger spot size on the rear side of the substrate compared to that on the front side the energy density is substantially lower.

FIG. 3 shows the energy density profiles within two laser spots that have the same energy but have different sizes. Curve 31 represents the energy density profile within a circular laser spot on the upper surface of a substrate where the diameter at half peak 32 is small. In this case the central part of the spot around the peak of the energy density distribution exceeds the threshold 33 for laser ablation of the film on the upper surface so ablation of the film over a circular region with diameter 34 occurs. Curve 35 represents the energy density profile within the laser spot on the lower surface of the substrate after the beam has expanded in passage through the substrate and where the diameter at half peak 36 is hence substantially larger. In this case even though the energy in the pulse is similar the increased size causes the peak energy density to fall below the ablation threshold for the film on the rear surface so that no ablation of the film occurs.

FIG. 4 is a detailed representation of the trajectory of the beam in the vicinity of the substrate. Only a section of the transparent substrate 41 which has a thickness 42 is shown. The laser beam shown by rays 43, 43' converges from a focussing f-theta lens that is not shown, towards the upper surface of the substrate. The distance between the focussing lens and the substrate surface is adjusted so that the laser beam focus 44 occurs at some point before the surface. The diameter of the beam 45 at the focus is given by:—

$$D = 4 \times M^2 \times \lambda \times f\text{-number}/\pi$$

where $M^2$ is a factor that indicates the number of modes in the beam, $\lambda$ is the laser wavelength and the f-number is the ratio of the lens focal length to the diameter of the beam at the lens. For the practical situation where $M^2 = 1.3$, $\lambda = 0.355$ μm, the lens focal length is 150 mm and the beam diameter is 10 mm the f-number is 15 and the minimum focal spot diameter, D, is 8.8 μm. For a laser with a wavelength 3 times longer at 1.064 μm but for the same lens focal length, same $M^2$ value and same laser beam diameter the minimum focal spot diameter increases to 26 μm. Because of beam spreading effects due to diffraction and divergence the minimum size of the laser beam in the vicinity of the focal spot is maintained sensibly constant over a distance along the beam path each side of the nominal focus point called the Rayleigh range 46 and given by:—

$$\text{Rayleigh range} = 4 \times \lambda \times (f\text{-number})^2 / M^2 \times \pi$$

The distance equal to twice the Rayleigh range is called the depth of focus 47. For the practical situation where $M^2 = 1.3$, $\lambda = 0.355$ μm, the lens focal length is 150 mm and the beam diameter is 10 mm we have an f-number of 15 and a depth of focus of 0.156 mm. For a laser with a wavelength 3 times longer at 1.064 μm but for the same lens focal length, same $M^2$ value and same laser beam diameter the depth of focus increases to 0.47 mm. At one Rayleigh range beyond the focal point the beam starts to diverge and expand. When the beam enters the substrate, beam deviating refractive effects occur due to differences between the refractive indices in air and the substrate, but nevertheless it continues to diverge and eventually exits from the rear face as shown in the Figure by rays 48 and 48'. If the substrate has flat and parallel sides the angle of divergence of the beam after it exits the substrate is the same as that entering it. The laser beam spot diameter as it exits the rear face 49 is significantly bigger than that on the front side.

FIG. 5 shows a situation similar to FIG. 4 but where the focus of the beam is positioned to be very close to or on the substrate surface. In this case the beam diameter at the exit face 51 is reduced compared to the situation shown in FIG. 4 as the expansion distance inside the substrate is reduced by an amount 52 which depends on the refractive index of the substrate material but is some significant part of the Rayleigh range. As the beam size at the input surface 53 is still close to the beam focus diameter it is clear that the ratio of the spot size on the rear of the substrate to that on the front is reduced compared to the situation shown in FIG. 4

FIG. 6 shows another situation similar to FIG. 4 but where the focus of the beam 61 is positioned at a distance from the substrate surface 62 that is greater than the Rayleigh range. In this case the beam has some distance to expand before reaching the substrate surface so the diameter at the surface 63 is greater than the minimum focal spot diameter. Beam bending effects occur as the beam enters the substrate at the interface between the air and the substrate due the difference in the refractive indices. These effects cause the beam to diverge less strongly in the substrate material as it has a higher refractive index than air and hence have the effect of reducing the size of the spot on the rear side. The size of the laser spot on the rear side of the substrate reduces as the refractive index of the substrate material increases. As the beam size at the input surface is larger than the minimum beam focus diameter and the beam size on the rear surface is reduced because of refractive effects, it is clear that the ratio of the spot size on the rear of the substrate to that on the front is reduced compared to the situation shown in FIG. 4.

From the situations shown in FIGS. 4, 5 and 6 it is clear that the largest ratio of exit spot diameter to input spot diameter occurs when the focal spot is positioned at a distance from the substrate surface approximating to the Rayleigh range. Under this condition the ratio of pulsed laser energy density in the beam at the entrance face of the substrate to that on the rear is maximized and the process window for ablating the coating on the input side of the substrate without damaging the coating on the rear surface of the substrate is widest.

FIG. 7 shows the key elements of an apparatus suitable for laser patterning the coatings on opposite sides of a transparent substrate using 2 pairs of scanner and lens units. A thin transparent substrate 71 is mounted between two pairs of opposing 2 axis scanner and lens units 72, 72' and 73, 73'. A pulsed laser 74 generates a beam that passes via mirrors 75, 75', a 50% beam splitter 76 to enter the upper 2 scanner units. A separate laser 77 feeds the lower two scanner and lens assemblies via a similar arrangement of optics. So that the lower laser beams can access the underside of the substrate it is mounted on an open frame type support 78 on CNC stages that cause it to move in 2 orthogonal directions X and Y between the scanner and lens units. The drawing shows the case where only two pairs of scanner and lens units are used to process the panel but in practice a greater number of pairs of units can be used if required to increase production rate. The units can be arranged linearly or in a 2D array depending on the particular situation FIG. 8 shows one possible arrangement of equipment that allows a pair of scanner and lens units to maintain focus at the correct distance above the substrate surface as the distance from, the surface to the scanner lenses changes in the Z direction due to variations in substrate thickness and flatness.

In the case shown the panel 81 is not flat due to sag in the Z direction and the distance of the upper surface from the upper scanner and lens unit has increased and the distance from the lower surface to the lower scanner and lens unit has decreased. Laser diodes 82, 82' are attached to the scanner and lens units and are arranged to direct beams obliquely onto the panel surfaces. Due to the oblique angles of incidence of the laser radiation from the diodes the spots created on the surface of the substrate move laterally as the substrate surface positions change in Z. The laser spots on both surfaces are imaged by camera units 83, 83' attached to the scanner and lens units and the camera output signals are processed to give information about the distance of the scanner and lens unit from the adjacent substrate surface. In the case shown, because of the sag of the substrate, the laser spot directed onto the upper surface of the substrate has moved laterally to the right in the X direction in the Figure and that produced on the lower surface of the substrate has moved laterally to the left in the X direction. The laser spot movements on both sides of the panel are detected by the camera units which then generate signals that are processed by servo control units 84, 84' and used to correct the position of the focal points. The correction can be made by moving the scanner and lens units on CNC stages in the Z direction or by moving an optical component in a beam expansion telescope to zoom the focus in the z direction. The drawing shows an arrangement of the latter type where the output of the servo motor controllers is used to change the separation between optical components in beam expansion telescopes 85, 85' attached to each scanner unit 86, 86'. With this arrangement the laser beams 87, 87' from lasers 88, 88' are focussed by lenses 89, 89' so that the focal spots remain at the correct position with respect to the substrate surfaces.

The direct-writing described above is of the vector variety. In other embodiments, the direct-writing may be of the scanning raster variety.

The invention claimed is:

1. A method of processing a workpiece, the workpiece comprising a transparent substrate having first and second films respectively formed on first and second surfaces thereof, by direct-write laser ablation, the method comprising:
   positioning a first lens unit of a first laser beam delivery apparatus facing the first surface of the substrate to direct-write the first film on the first surface of the transparent substrate, the transparent substrate being transparent to laser radiation; and
   direct-writing the first film on the first surface of the transparent substrate with a first laser beam from the first lens unit being focused at an intermediate point between the first lens unit and the first film such that a focal point of the first laser beam falls short of the first film and the first laser beam is diverging as it impinges on the first film and continues through the transparent substrate and impinges on the second film during the direct-writing of the first film, wherein
   an energy of the first laser beam and a distance between the focal point of the first laser beam and the first film are set such that an energy density which the first film is subjected to by the first laser beam is greater than an ablation threshold energy density of the first film and an energy density which the second film is subjected to by the first laser beam is less than an ablation threshold energy density of the second film on the second surface of the transparent substrate, such that the first film is removed by the first laser beam in an area where the first laser beam impinges on the first film, and the second film is undamaged by the first laser beam in an area where the first laser beam impinges on the second film during the direct-writing of the first film.

2. The method of claim 1, wherein the distance between the focal point of the first laser beam and the first surface is approximately equal to the Rayleigh range of the first laser beam.

3. The method of claim 1, further comprising
   positioning a second lens unit of a second laser beam delivery apparatus facing the second surface of the transparent substrate to direct-write the second film; and
   direct-writing the second film with a second laser beam from the second lens unit focused at an intermediate point between the second lens unit and the second film such that a focal point of the second laser beam falls short of the second film and the second laser beam is diverging as it impinges on the second film.

4. The method of claim 1, wherein the distance between the focal point of the second laser beam and the second surface is approximately equal to the Rayleigh range of the second laser beam.

5. The method of claim 3, wherein the direct-writing of the first film and the direct-writing of the second film are carried out simultaneously.

6. The method of claim 3, further comprising, during direct-writing at least one of the first film or the second film, adjusting the focal point of the corresponding first or second lens unit to compensate for non-flatness of the workpiece and maintain the focal point at a predetermined distance from the corresponding first or second surface.

7. The method of claim 1, wherein a plurality of laser beam delivery apparatuses are used in parallel on the first or second film.

8. The method of claim 1, wherein the transparent substrate consists of a glass sheet having a thickness less than 1 mm.

9. The method of claim 1, wherein the transparent substrate consists of a polymer sheet having a thickness less than 0.1 mm.

10. The method of claim 1, wherein the transparent substrate consists of a glass sheet having a thickness less than 1 mm or a polymer sheet having a thickness less than 0.1 mm.

11. A system for processing a workpiece, the workpiece comprising a transparent substrate having first and second films respectively formed on first and second sides thereof, by direct write laser ablation, the system comprising:
    a first laser beam delivery apparatus comprising a first laser beam scanner and a first lens unit;
    a carrier configured to receive a workpiece thereon; and
    a mounting device for mounting the first laser beam delivery apparatus and the carrier for relative movement to permit the direct-writing of the first film on the first side of the transparent substrate, the transparent substrate being transparent to laser radiation, wherein a first laser beam of the first lens unit of the first laser beam delivery apparatus is focused at an intermediate point between the first lens unit and the first film such that a first focal point falls short of the first film and the first laser beam is diverging as it impinges on the first film and continues through the transparent substrate and impinges on the second film during the direct-writing of the first film, wherein:
    an energy of the first laser beam and a distance from the first focal point to the first film are set such that an energy density which the first film is subjected to by the first laser beam is greater than an ablation threshold energy density of the first film and an energy density which the second film is subjected to by the first laser beam is less than an ablation threshold energy density of the second film on the second side of the transparent substrate, such that the first film is removed by the first laser beam in an area where the first laser beam impinges on the first film, and the second film is undamaged by the first laser beam in an area where the first laser beam impinges on the second film during the direct-writing of the first film.

12. The system of claim 11, wherein the distance from the first focal point of the first laser beam to the first side is approximately equal to the Rayleigh range of the first laser beam.

13. The system of claim 11, further comprising a second laser beam delivery apparatus comprising a second laser beam scanner and a second lens unit, the mounting device being further configured to mount the second laser beam delivery apparatus and the carrier for relative movement to permit the direct-writing of the second film on the second side of the transparent substrate, wherein a second laser beam of the second lens unit of the second laser beam delivery apparatus is focused at an intermediate point between the second lens unit and the second film such that the second laser beam is diverging as it impinges on the second film.

14. The system of claim 13, wherein first and second laser beam delivery apparatuses are configured to carry out the direct-writing of the first film and the direct-writing of the second film simultaneously.

15. The system of claim 13, further comprising:
an imaging device to determine the distance between the first lens unit and the first side of the transparent substrate and between the second lens unit and the second side of the substrate; and
a controller configured to receive the distance determination from the imaging device, to adjust the focus of at least one of the first or second lens unit to maintain the focal point of the corresponding first or second laser beam at a required distance from the corresponding first or second side of the transparent substrate.

16. The system of claim 11, further comprising a plurality of said laser beam delivery apparatuses mounted for use in parallel on said film.

17. The system of claim 11, wherein the mounting device comprises a pair of linear stage units to allow relative motion in two axes between the transparent substrate and said scanner and lens units.

18. The system of claim 11, wherein the transparent substrate consists of a glass sheet having a thickness less than 1 mm.

19. The system of claim 11, wherein the transparent substrate consists of a polymer sheet having a thickness less than 0.1 mm.

20. The system of claim 11, wherein the transparent substrate consists of a glass sheet having a thickness less than 1 mm or a polymer sheet having a thickness less than 0.1 mm.

* * * * *